US010188090B2

(12) United States Patent
Brewer

(10) Patent No.: US 10,188,090 B2
(45) Date of Patent: Jan. 29, 2019

(54) FISH RECEPTACLE

(71) Applicant: Donald Brewer, Romulus, MI (US)

(72) Inventor: Donald Brewer, Romulus, MI (US)

(*) Notice: Subject to any disclaimer, the term of this patent is extended or adjusted under 35 U.S.C. 154(b) by 156 days.

(21) Appl. No.: 15/190,334

(22) Filed: Jun. 23, 2016

(65) Prior Publication Data

US 2016/0374325 A1 Dec. 29, 2016

Related U.S. Application Data

(60) Provisional application No. 62/183,360, filed on Jun. 23, 2015.

(51) Int. Cl.
*B65D 43/12* (2006.01)
*A01K 97/18* (2006.01)
*A01K 97/20* (2006.01)

(52) U.S. Cl.
CPC .............. *A01K 97/20* (2013.01); *A01K 97/18* (2013.01); *B65D 43/12* (2013.01)

(58) Field of Classification Search
CPC ........ A01K 97/20; A01K 97/06; A01K 97/18; B65D 43/12; B65D 43/20
USPC ............. 43/55, 54.1, 53.5; 220/254.1, 254.9, 220/345.1, 345.4; 206/315.11; 224/920
See application file for complete search history.

(56) References Cited

U.S. PATENT DOCUMENTS

| | | | | |
|---|---|---|---|---|
| 85,647 A * | 1/1869 | Dolan | ...................... | E05G 1/00 109/73 |
| 581,293 A * | 4/1897 | Leggett | ................ | B65D 47/286 220/254.9 |
| 752,600 A * | 2/1904 | Sinclair | .................. | A01K 97/06 232/54 |
| 882,184 A * | 3/1908 | Willard | .................. | A01K 97/04 220/6 |
| 1,177,891 A * | 4/1916 | Pacorek | .................. | A24F 19/06 220/345.4 |
| 1,489,255 A * | 4/1924 | Lane | ....................... | A01K 97/06 43/55 |
| 2,091,893 A * | 8/1937 | Tillinghast | ............. | A01K 97/18 43/53.5 |

(Continued)

FOREIGN PATENT DOCUMENTS

DE 3710671 A1 * 10/1987 ............. A01K 97/04
JP 08051907 A * 2/1996

(Continued)

*Primary Examiner* — Darren W Ark
(74) *Attorney, Agent, or Firm* — Global Intellectual Property Ageny, LLC; Daniel Boudwin

(57) ABSTRACT

A fish receptacle. The fish receptacle includes a container having a hinged lid with a door assembly providing access to an interior of the container. The door assembly enables users to engage a fish, hands free, thereby enabling users to manipulate the fish and subsequently store it in the interior of the container without utilizing their hands. The door assembly includes an aperture and a frame therearound, wherein the aperture provides access to the interior of the container. The frame includes a track having rails and slot, wherein a sliding member is slidably disposed. The sliding member is movable between a closed position and an open position along the track, thereby enabling the sliding door assembly to be opened to expose the aperture and/or closed onto a fish to pin it against a wall of the frame for hands free manipulation.

11 Claims, 3 Drawing Sheets

(56) References Cited

U.S. PATENT DOCUMENTS

| | | | | |
|---|---|---|---|---|
| 2,160,436 A * | 5/1939 | Jones | A01K 97/04 | 220/345.4 |
| 2,189,478 A * | 2/1940 | St. George | A01K 97/18 | 43/4 |
| 2,544,049 A * | 3/1951 | Sawner | A01K 97/04 | 220/322 |
| 2,547,592 A * | 4/1951 | Morris | A01K 97/18 | 43/53.5 |
| 2,562,636 A * | 7/1951 | Odneal | A01K 97/20 | 217/124 |
| 2,741,061 A * | 4/1956 | Harrison | A01K 97/18 | 43/53.5 |
| 3,025,629 A * | 3/1962 | Sears | A01K 97/05 | 220/232 |
| 3,286,390 A * | 11/1966 | Guice | A01K 97/06 | 43/57.1 |
| 3,287,845 A * | 11/1966 | Smith | A01K 97/18 | 294/61 |
| 3,367,061 A * | 2/1968 | Primmer | A01K 63/02 | 43/55 |
| 3,524,278 A * | 8/1970 | Wolfe | A01K 97/20 | 43/55 |
| 3,553,880 A * | 1/1971 | Splickan et al. | A01K 97/20 | 43/55 |
| 3,691,666 A * | 9/1972 | Herdwig | A01K 97/20 | 220/326 |
| 3,738,050 A * | 6/1973 | Naill | A01K 97/18 | 43/53.5 |
| 3,807,080 A * | 4/1974 | Reynolds | A01K 97/18 | 43/53.5 |
| 3,905,145 A * | 9/1975 | Cunningham | A01K 97/18 | 43/53.5 |
| 3,919,803 A * | 11/1975 | Manguso | A01K 97/20 | 43/55 |
| 3,968,588 A * | 7/1976 | Peterson, Sr. | A01K 97/18 | 43/53.5 |
| 4,000,577 A * | 1/1977 | Kelley | A01K 97/04 | 43/55 |
| 4,008,540 A * | 2/1977 | Brower | A01K 97/05 | 43/55 |
| 4,070,786 A * | 1/1978 | Dunham | A01K 97/05 | 43/55 |
| 4,196,538 A * | 4/1980 | Crone | A01K 97/00 | 206/315.11 |
| 4,272,906 A * | 6/1981 | Liebling | A01K 77/00 | 43/11 |
| 4,638,593 A * | 1/1987 | Garcia | A01K 97/06 | 43/54.1 |
| 4,671,008 A * | 6/1987 | Lindemood | A01K 97/05 | 43/54.1 |
| 4,845,886 A * | 7/1989 | Robinson | A01K 97/20 | 224/920 |
| 5,038,515 A * | 8/1991 | Moorhead | A01K 63/02 | 43/55 |
| 5,107,990 A * | 4/1992 | Wicherski | A61M 5/3205 | 206/1.5 |
| 5,156,291 A * | 10/1992 | Mielke | A01K 97/20 | 220/254.5 |
| 5,249,388 A * | 10/1993 | Crabtree | A01K 97/22 | 43/55 |
| 5,337,911 A * | 8/1994 | Holub | A45C 11/20 | 16/383 |
| 5,400,914 A * | 3/1995 | Lin | B65D 43/20 | 220/254.9 |
| 5,458,256 A * | 10/1995 | Opheim | A01C 15/006 | 220/345.3 |
| 5,505,328 A * | 4/1996 | Stribiak | A01K 97/06 | 206/315.11 |
| 5,941,016 A * | 8/1999 | Welcher | A01K 97/20 | 220/323 |
| 6,059,243 A * | 5/2000 | Hikage | B60N 3/102 | 248/311.2 |
| 6,067,745 A * | 5/2000 | Adams | A01K 97/20 | 43/55 |
| 6,389,731 B1 * | 5/2002 | Freeman | A01K 97/18 | 43/4 |
| 6,540,098 B1 * | 4/2003 | Jarvis | B65D 21/0219 | 220/254.1 |
| 6,584,727 B1 * | 7/2003 | De Shazer | A01K 97/05 | 43/55 |
| 6,772,554 B1 * | 8/2004 | Boone | A01K 97/18 | 43/54.1 |
| 6,809,658 B1 * | 10/2004 | Lofaso | G08B 5/36 | 206/315.11 |
| 7,155,859 B1 * | 1/2007 | Brooks | A01K 97/06 | 206/315.11 |
| 7,389,608 B1 * | 6/2008 | MacKay | A01K 97/05 | 206/315.11 |
| 7,426,801 B2 * | 9/2008 | Freburger, Jr. | A01K 97/05 | 43/4 |
| 7,464,498 B2 * | 12/2008 | Lester | A01K 97/20 | 43/55 |
| 7,788,843 B2 * | 9/2010 | Boos, Jr. | A01K 97/20 | 43/55 |
| 7,866,541 B2 * | 1/2011 | Kerekes | A01K 97/20 | 235/1 A |
| 2002/0083638 A1 * | 7/2002 | Cunningham, Sr. | A01K 97/20 | 43/54.1 |
| 2008/0230542 A1 * | 9/2008 | Thielke | A01K 97/00 | 220/212 |
| 2009/0038204 A1 * | 2/2009 | Duszynski | A01K 97/20 | 43/1 |
| 2009/0234975 A1 * | 9/2009 | Chang | G06F 1/1616 | 710/1 |
| 2018/0007885 A1 * | 1/2018 | Nelson | A01K 97/18 | |

FOREIGN PATENT DOCUMENTS

| | | | | |
|---|---|---|---|---|
| JP | 08214750 A * | 8/1996 | | |
| JP | 2000041558 A * | 2/2000 | | |
| JP | 3318286 B2 * | 8/2002 | | |
| JP | 2002306042 A * | 10/2002 | | |
| JP | 2003116437 A * | 4/2003 | | |
| JP | 2003169582 A * | 6/2003 | | |
| JP | 2003235419 A * | 8/2003 | | |
| JP | 2004222718 A * | 8/2004 | | |
| JP | 3572029 B2 * | 9/2004 | | |
| JP | 2007275038 A * | 10/2007 | | |
| JP | 2009225786 A * | 10/2009 | | |
| JP | 2011036219 A * | 2/2011 | | |
| JP | 2012157318 A * | 8/2012 | | |
| JP | 5054212 B2 * | 10/2012 | | |
| JP | 5254837 B2 * | 8/2013 | | |
| JP | 5371140 B2 * | 12/2013 | | |
| JP | 2014117250 A * | 6/2014 | | |
| JP | 3210864 U * | 6/2017 | | |
| KR | 200460347 Y1 * | 5/2012 | | A01K 97/05 |
| KR | 200469545 Y1 * | 10/2013 | | |
| WO | WO-2013027933 A2 * | 2/2013 | | A01K 97/05 |

* cited by examiner

FISH RECEPTACLE

CROSS REFERENCE TO RELATED APPLICATIONS

This application claims the benefit of U.S. Provisional Application No. 62/183,360 filed on Jun. 23, 2015. The above identified patent application is herein incorporated by reference in its entirety to provide continuity of disclosure.

BACKGROUND OF THE INVENTION

The present invention relates to receptacles. More specifically, the present invention relates to a fish receptacle having a door assembly disposed on a hinged lid, wherein the door assembly includes a sliding member configured to open and close in order to pin a fish for hands free manipulation thereof and provide access to an interior volume of the receptacle.

Many individuals enjoy fishing, but dislike having to remove a hook from a fish once the fish is caught. Once a fish is caught, the fish often flails and makes erratic and aggressive movements in an attempt to free itself. These movements can lead to the fish becoming loose and/or an individual puncturing his or her hand with the hook, which can be quite painful and extremely aggravating. Moreover, after catching a fish, an individual typically grasps the fish in order to remove the hook from its mouth. However, handling a fish in this manner causes the slime, dirt, and other debris on the fish to transfer to the individuals' hands. This is unsanitary because any bacteria transferred to the individual's hand from the fish may subsequently transfer onto the individual's boat, clothes, food, or other fishing equipment. Therefore, there is a need in the art for a fish receptacle that is capable of pinning a fish, thereby enabling a user to manipulate the fish hands free and then subsequently store it therein.

The use of a fish receptacle for storing and receiving fish is known in the prior art. More specifically, a fish receptacles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 7,464,498; U.S. Pat. No. 7,155,859; U.S. Pat. No. 5,156,291; U.S. Pat. No. 7,389,608; and U.S. Pat. No. 6,584,727.

While these devices fulfill their respective, particular objectives and requirements, the aforementioned patents do not disclose a fish receptacle including a container, a lid pivotally connected to the container, a sliding door assembly affixed to the lid, the door assembly comprising, an aperture, a frame, a track positioned within the frame, a sliding member slidably disposed in the track, and a handle disposed on the sliding member.

In these respects, the fish receptacle according to the present invention substantially departs from the conventional concepts and designs of the prior art, and in so doing provides an apparatus primarily developed for the purpose of providing a device for facilitating the hand's free manipulation and storage of fish after being caught.

SUMMARY OF THE INVENTION

In view of the foregoing disadvantages inherent in the known types of fish receptacles now present in the prior art, the present invention provides an improved fish receptacle wherein the same can be utilized for providing convenience for the user when handling and storing fish. The present invention comprises a container having a base, one or more upstanding sidewalls, an open upper end, defining an interior volume, the container configured to store water and fish therein; a lid pivotally connected to the upper end of the container, the lid providing access to the interior volume of the container; a door assembly disposed on the lid, the door assembly comprising a frame disposed around a perimeter of an aperture disposed on the lid; a track disposed with the frame and configured for sliding engagement with a sliding member; wherein the sliding member is movable between an open position to expose the aperture of the door assembly and a closed position to at least partially cover the aperture.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
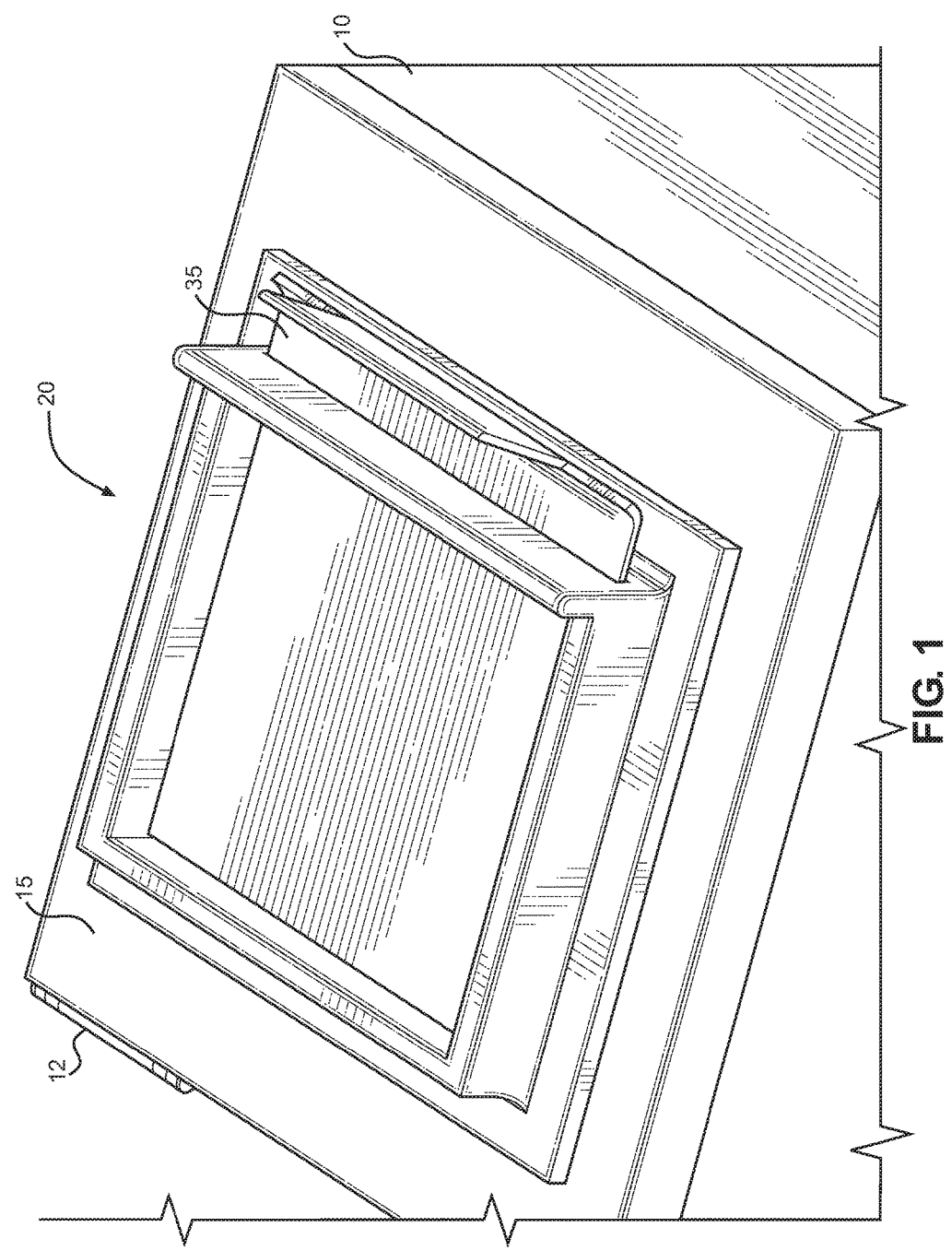
FIG. 1 shows a perspective view of the fish receptacle.

Reference is made herein to the attached drawings. Like reference numerals are used throughout the drawings to depict like or similar elements of the fish receptacle. The figures are intended for representative purposes only and should not be considered to be limiting in any respect.

Referring now to FIG. 1, there is shown a perspective view of the fish receptacle. The fish receptacle comprises a container 10 including a hinged lid 15 having a door assembly 20 having a sliding member 35 slidably disposed thereon, wherein the sliding member 35 is movable on a track between a closed position and an open position. The sliding door member 35 is configured to pin a fish against a back wall thereof, hands free, and provide access to the interior of the container 10. The container 10 comprises a base, one or more sidewalls, an open upper end (hencefore called an "opening"), defining an interior volume that is configured to receive and store fish therein. In one embodiment, the container 10 comprises a cooler having insulated sidewalls. In another embodiment, the container 10 comprises a live well configured to keep caught fish alive. In an alternative embodiment, the container 10 comprises a pail.

The lid 15 is pivotally connected to the container 10. In one embodiment, the lid 15 is integral to the container 10 and pivotally connected by a living hinge. In another embodiment, the lid 15 is a separate component from the container 10 and is pivotally attached to the container 10 via a mechanical hinge, such as a barrel hinge 12. The container 10 and lid 15 are constructed of a plastic material, such as polycarbonate, polyvinyl chloride, polypropylene, or polyethylene, which includes insulation, such as polystyrene, polyisocyanurate, and/or polyurethane. In one embodiment, the container 10 and the lid 15 are composed of the same material and are integrally formed, such as by injection molding.

Figure 2:
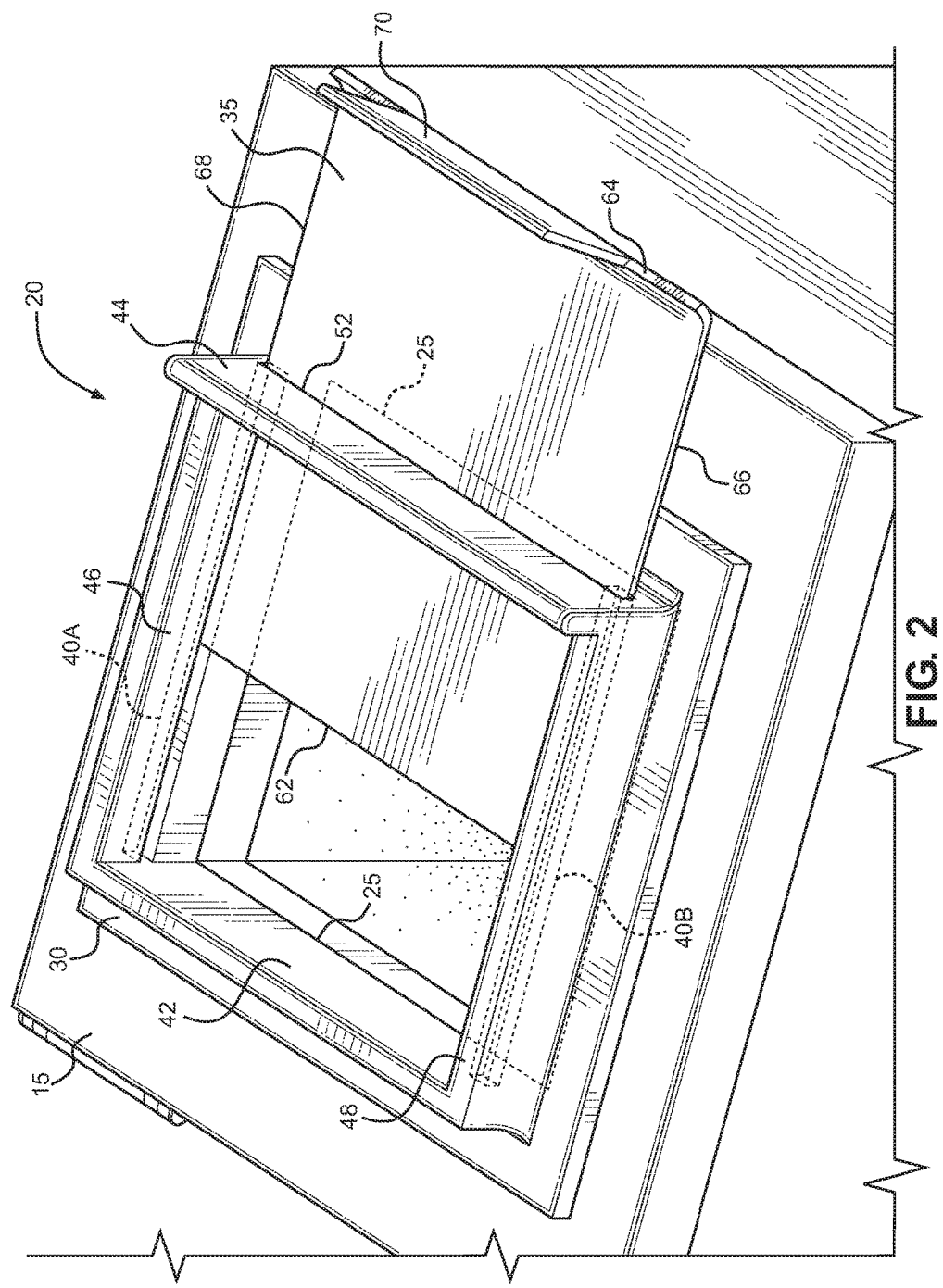
FIG. 2 shows a partial phantom view of the door assembly of the fish receptacle.

Referring now to FIG. 2, there is shown a partial phantom view of the door assembly of the fish receptacle. The door assembly 20 of the fish receptacle is integrally affixed to the lid 15 of the fish receptacle. The door assembly 20 comprises an aperture 25, a frame 30, and the sliding member 35. The aperture 25 provides access to the interior volume of the container 10 without having to open the lid 15. The frame 30 is disposed around a perimeter of the aperture 25 and comprises a track 40 wherein the sliding member 35 is slidably disposed. In the depicted embodiment, the frame 30 is defined by a rectangular member comprising a front wall 42, a rear wall 44, a left wall 46, and a right wall 48, wherein the track 40 comprises two opposing rails 40A and 40B disposed on the left and right walls 46, 48 and a slot 52 on the rear wall 44. In one embodiment, the frame 30 may be constructed of aluminum metal. However, in alternative embodiments, the frame 30 may be constructed of steel, brass, and/or other similar metals. Moreover, in other embodiments, the frame 30 may comprise a circular shaped member or polygonal shaped member having a track with rails configured to receive the sliding member 35.

The sliding member 35 comprises a front end 62, a rear end 64, a left side 66, and a right side 68. In the depicted embodiment, the left and right sides 66, 68 of the sliding member 35 are slidably disposed through the slot 52 of the rear wall 44 and on the two opposing rails 40A, 40B disposed on the left and right walls 46, 48 of the frame 30. The slot 52 guides the sliding member 35 horizontally along the rails 40A, 40B, which is configured to slide horizontally along the rails 40A, 40B. The sliding member 35 is moveable between an open position and a closed position along the track 40 in order to expose the aperture 25 and provide access to the interior compartment of the container 10. The sliding member 35 may further be removed from the track 40 and placed back onto the track 40 via the slot 52. In this way, a user may remove the sliding member 35 to completely expose the aperture 25 and provide constant access to the interior volume of the container 10. The sliding member 35 further comprises a handle 70 for grasping the sliding member 35 to open and close it. In the depicted embodiment, the handle 70 is disposed on the rear end 64 of the sliding member 35. The handle 70 protrudes from the sliding member 35 and is substantially perpendicular relative to the sliding member 35. The front end 62 of the sliding member 35 comprises an engaging area configured to pin a fish against the front wall 42 of the frame 30.

Figure 3:
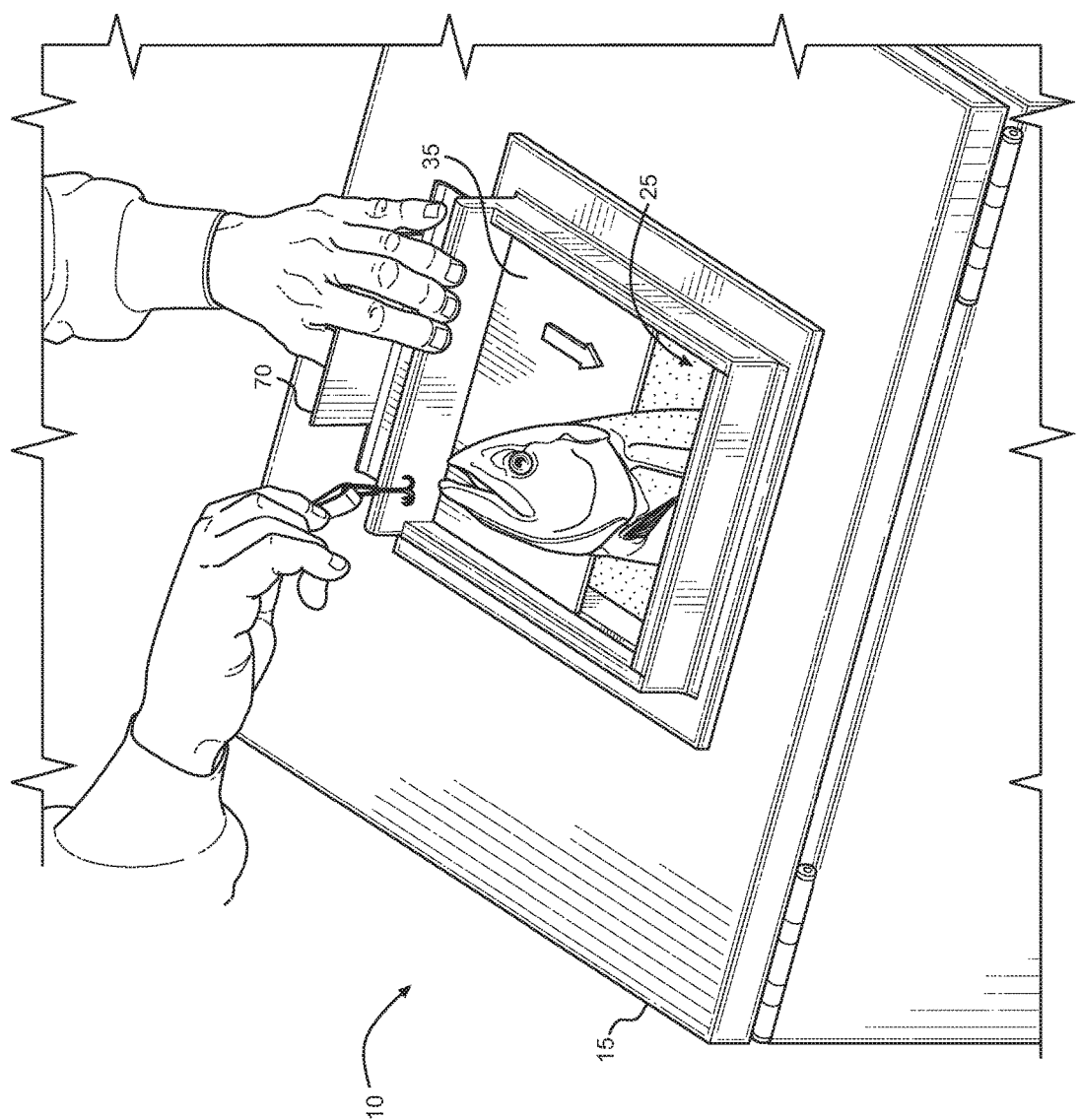
FIG. 3 shows a view of the fish receptacle in use.

Referring now to FIG. 3, there is shown a view of the fish receptacle in use. In one use, the receptacle 10 is employed during fishing in order to have a device capable of pinning a captured fish such that a user does not have to use his or her hands to remove the hook and subsequently place it into the container of the receptacle. Upon catching a fish a user may slide the sliding member 35 of the door open via the handle 70, thereby exposing the aperture 25 thereunder. The user then partially inserts the fish into the aperture 25 and subsequently closes the sliding member 35 back onto the fish, thereby grasping the fish in between the front wall 42 of the frame 30 and exerting a force thereon. The user may then remove the hook from the fish and open the sliding member 35 back up, thereby allowing the fish to fall directly into the interior volume of the receptacle 10 without ever having to use his or her hand to handle the fish.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fish receptacle, comprising:
   a container having a base, one or more upstanding sidewalls, an open upper end, defining an interior volume, the container configured to store water and fish therein;
   a lid pivotally connected to the upper end of the container, the lid providing access to the interior volume of the container;
   a door assembly disposed on the lid, the door assembly comprising a frame disposed around a perimeter of an aperture disposed through the lid;
   wherein the frame is affixed to an upper surface of the lid about the aperture, wherein a front wall, a rear wall, a left wall, and a right wall each extend perpendicularly away from the frame;
   a track disposed within the frame, wherein the track comprises two opposing rails disposed within each of the left and right walls of the frame and a slot through the rear wall of the frame;
   wherein the door assembly further comprises a sliding member configured for sliding engagement with the track;
   wherein the sliding member is movable between an open position to expose the aperture of the door assembly and a closed position to at least partially cover the aperture.

2. The fish receptacle of claim 1, wherein the sliding member further comprises a front end opposite a rear end, wherein the front end comprises an engaging area for pinning a fish.

3. The fish receptacle of claim 2, wherein the sliding member further comprises a handle disposed on the rear end, wherein the handle is oriented perpendicularly relative to the sliding member.

4. The fish receptacle of claim 1, wherein the track is located in a horizontal plane.

5. The fish receptacle of claim 1, wherein the sliding member further comprises a left side and right side, the left and right sides slidably disposed through the slot and in the two opposing rails of the track.

6. The fish receptacle of claim 1, wherein the lid and container are integrally formed and pivotally connected via a living hinge.

7. The fish receptacle of claim 1, wherein the lid is pivotally connected to the container via a mechanical hinge.

8. The fish receptacle of claim 7, wherein the mechanical hinge is a barrel hinge.

9. The fish receptacle of claim 1, wherein the rear wall comprises a height greater than each of the front wall, left wall, and the right wall.

10. A method of using a fish receptacle, comprising:
    providing a container having a base, one or more upstanding sidewalls, an open upper end, defining an interior volume, the container configured to store water and fish therein, a lid pivotally connected to the upper end of the container, the lid providing access to the interior volume of the container, a door assembly disposed on the lid, the door assembly comprising a frame disposed around a perimeter of an aperture disposed through the lid, wherein the frame is affixed to an upper surface of the lid about the aperture, wherein a front wall, a rear wall, a left wall, and a right wall each extend perpendicularly away from the frame, a track disposed within the frame, wherein the track comprises two opposing rails disposed within each of the left and right walls of the frame and a slot through the rear wall of the frame, wherein the door assembly further comprises a sliding member configured for sliding engagement with the track, wherein the sliding member is movable between an open position to expose the aperture of the door assembly and a closed position to at least partially cover the aperture;

sliding the sliding member slidably engaged with the track disposed within the frame such that the aperture is exposed;

inserting a fish partially into the aperture such that a head of the fish is external to the interior volume of the container;

sliding the sliding member towards the front wall of the frame, such that the fish is secured between the front wall and a front end of the sliding member;

removing a hook from the fish; and sliding the sliding member away from the front wall, such that the fish falls through the aperture and into the interior volume.

11. The method of using the fish receptacle of claim 10, further comprising grasping the rear wall of the frame and a rear end of the sliding member such that the fish is secured between the front wall and the front end.

* * * * *